United States Patent [19]
Kim

[11] Patent Number: 5,860,488
[45] Date of Patent: Jan. 19, 1999

[54] SAFETY LEVER APPARATUS AND A METHOD OF USING THE SAME

[75] Inventor: Hak Shin Kim, Masan, Rep. of Korea

[73] Assignee: Samsung Heavy Industries Co., Ltd., Rep. of Korea

[21] Appl. No.: 891,191

[22] Filed: Jul. 10, 1997

[30] Foreign Application Priority Data

Jul. 31, 1996 [KR] Rep. of Korea .................. 1996-32082

[51] Int. Cl.$^6$ .......................... B60K 28/00; B60R 21/00
[52] U.S. Cl. ............................................ 180/271; 192/4 A
[58] Field of Search .................................. 180/271, 287; 192/4 A, 4 R, 129 R

[56] References Cited

U.S. PATENT DOCUMENTS

| | | | |
|---|---|---|---|
| 3,715,002 | 2/1973 | Halls et al. | 180/271 |
| 3,811,020 | 5/1974 | Johnson et al. | 180/271 |
| 4,008,626 | 2/1977 | Schulte et al. | 180/271 |
| 4,388,980 | 6/1983 | Vig et al. | 180/271 |
| 4,489,805 | 12/1984 | Okabe | 180/271 |
| 4,955,452 | 9/1990 | Simonz | 180/271 |
| 5,036,962 | 8/1991 | Amagasa | 192/4 A |
| 5,062,509 | 11/1991 | Carpenter et al. | 192/4 A |
| 5,383,532 | 1/1995 | Shonai et al. | 180/271 |

*Primary Examiner*—Paul N. Dickson
*Attorney, Agent, or Firm*—Harness, Dickey & Pierce, P.L.C.

[57] ABSTRACT

Disclosed is a safety lever apparatus and a method of using the safety lever apparatus for a heavy equipment having an operating box which is pivotally mounted to one side of an operating seat, capable of preventing an incorrect operation of the heavy equipment due to a physical contact between a working lever and an operator of the heavy equipment at the time that the operator leaves from an operating room during the operation of the heavy equipment. The safety lever apparatus comprises an operating box which is rotatably mounted to an operating seat. A complex lever of the safety lever apparatus is pivotally fixed to the operating box and is operated by an operator of the equipment in order to allow the operator for going out of an operating room. A first cam member of the safety lever apparatus blocks or transmits an operating force which is transmitted from the operating member to a working device. The first cam member rotates together with the complex lever. A spring of the safety lever apparatus rotates the operating box due to an expansion and a contraction of the spring. A second cam member of the safety lever apparatus adjusts the expansion and the contraction of the spring. The second cam member operates as a cam mechanism in relation to the movement of the first cam member.

8 Claims, 9 Drawing Sheets

SAFETY LEVER APPARATUS AND A METHOD OF USING THE SAME

BACKGROUND OF THE INVENTION

1. Field of the Invention

The present invention relates to a safety lever apparatus and a method of using the same, and more particularly to a safety lever apparatus and a method of using the safety lever apparatus for a heavy equipment having an operating box which is pivotally mounted to one side of an operating seat, capable of preventing an incorrect operation of the heavy equipment due to a physical contact between a working lever and an operator of the heavy equipment at the time that the operator leaves from an operating room during the operation of the heavy equipment.

2. Description of the Prior Art

Generally, when an operator of a heavy equipment leaves from an operating room of the heavy equipment under the state that the heavy equipment operates, an incorrect operation of the heavy equipment due to a physical contact between a working lever and the operator can be generated. As a result, a serious accident can be generated for the operator and other peoples. Further, objects adjacent to a field of construction work can be damaged. Therefore, it is important to prevent the incorrect operation of the heavy equipment from generating.

According to the prior art, an operating box is installed to one side of an operating seat so that the operator can out of the operating room after rotating the operating box by operating a safety lever fixed to the operating box. At this time, the operator must put forth his strength to lift the operating box. Accordingly, a variety of techniques for reducing the operator's labors have been developed.

FIG. 1 illustrates a safety lever apparatus according to the prior art. Hereinbelow, an operation principle of the safety lever apparatus will be briefly explained.

Referring to FIG. 1, an operating lever 6 is pivotally fixed to a seat bracket 5 of an operating seat 1. If an operator rotates the operating lever 6 in the counter-clockwise direction by applying an outer force P to the operating lever 6, a locking state of a locking portion integrally formed with the operating lever 6 is released, whereby an operating box 2 rotates in the clockwise direction due to an expansion force of a gas spring 7.

A safety lever 4 is used for compensating the expansion force of the gas spring 7 and for quickly rotating the operating box 2. Further, the safety lever 4 is used for returning the operating box 2 to the origin. If the operating box 2 rotates in the clockwise direction, a limit switch bar 8 rotates a limit switch lever 9 in the counter-clockwise direction. Accordingly, an electric source of a limit switch is converted to an off-state, and thereby an operating pressure for operating a working device is blocked by a solenoid valve (not shown). Accordingly, although the operator unconsciously is brought into contact with the working lever 3 due to the operator's carelessness, the working device not operates. As a result, an accident due to the careless operator can be prevented.

Meanwhile, when the operator returns to the operating seat 1, the operator pressurizes the operating box 2 by the palm of the hand. Then, the operating box 2 rotates in the counter-clockwise direction and returns to the origin, whereby the operating box 2 is locked again. Accordingly, it is possible to perform a predetermined work by operating the working lever 3.

Since the safety lever 4 is mounted to the operating box 2 besides the operating lever 6 rotating the operating box 2, the number of assemble parts of the heavy equipment is increased and the manufacturing cost of the heavy equipment is increased. Further, since the operating lever 6 and devices related to thereof are exposed, appearances of the heavy equipment is bad. In addition, since the operator pressurizes an upper surface the operating box 2 by the palm of the hand in order to return the operating box 2 to the origin after rotating the operating box 2, the incorrect operation of the heavy equipment can be generated due to the physical contact between a variety of switches and the operator of the heavy equipment. Meanwhile, when the operator wants to release the safety lever, the operator pressurizes the operating lever 6 by the palm of the hand after descending the hand. Accordingly, the operator feels inconvenience and an accident can be generated due to the locking of the operating lever to a shoulder of the operator during the descending the hand.

SUMMARY OF THE INVENTION

The present invention is contrived to solve the foregoing problems. It is a first object of the present invention to provide a safety lever apparatus for a heavy equipment capable of preventing an incorrect operation of the heavy equipment due to a physical contact between a working lever and an operator of the heavy equipment at the time that the operator leaves from an operating room during the operation of the heavy equipment.

It is a second object of the present invention to provide a using method of a safety lever apparatus for a heavy equipment capable of preventing an incorrect operation of the heavy equipment due to a physical contact between a working lever and an operator of the heavy equipment at the time that the operator leaves from an operating room during the operation of the heavy equipment.

In order to achieve the above first object, the present invention provides a safety lever apparatus comprising:

- an operating box being rotatably mounted to an operating seat, the operating box including an operating means for directing a predetermined work to an equipment;
- a complex lever being pivotally fixed to the operating box, the complex lever being operated by an operator of the equipment in order to allow the operator for going out of an operating room;
- a first cam member for blocking or transmitting an operating force which is transmitted from the operating means to a working device, the first cam member rotating together with the complex lever;
- a spring for rotating the operating box due to an expansion and a contraction of the spring; and
- a second cam member for adjusting the expansion and the contraction of the spring, the second cam member operating as a cam mechanism in relation to the movement of the first cam member, and the second cam member being pivotally fixed to the operating box.

The second cam member is provided with a second groove which is formed at one side of the second cam member. The spring is provided with a stopper which is installed to one side of the spring. The spring contracts at the time that the stopper is inserted into the second groove, and the spring expands at the time that the stopper leaves from the second groove.

The operating box is provided with a limit switch lever which is pivotally fixed to the operating box. The first cam member includes a limit switch bar for rotating the limit switch lever at the time that the complex lever rotates and for blocking an operation force which is transmitted from the operating means to the working device.

The complex lever is provided with a first groove which is formed at one side of the complex lever. The first cam member is provided with a protrusion corresponding to the first groove. The complex lever and the first cam member rotate together by the engagement of the first groove and the protrusion.

Preferably, the spring comprises a gas spring.

Further, in order to achieve the above second object, the present invention provides a using method of a safety lever apparatus, comprising the steps of:

rotating a complex lever which is pivotally fixed to an operating box;

blocking an operating force for directing a predetermined work to an equipment by the rotation of a first cam member related to the complex lever according to the rotation of the complex lever, the operating force being transmitted from an operating means to the equipment; and releasing a fixing means for fixing a spring at a contraction state due to the movement of a second cam member operating as a cam mechanism in relation to the movement of the first cam member, and rotating the operating box which is connected with a spring by an expansion of the spring.

As described above, in the safety lever apparatus according to the present invention, the operator of the heavy equipment can safely leave from the operating room by using the safety lever under the state that the engine of the heavy equipment operates. The safety lever provides the function of an operating lever for rotating the operating box. Accordingly, the number of assemble parts constructing the equipment decreases. Further, the incorrect operation of the heavy equipment due to a physical contact between the working lever and the operator of the heavy equipment can be prevented. As a result, an accident due to the careless operator can be prevented.

BRIEF DESCRIPTION OF THE DRAWINGS

The above object and other characteristics and advantages of the present invention will become more apparent by describing in detail a preferred embodiment thereof with reference to the attached drawings, in which.

DETAILED DESCRIPTION OF THE INVENTION

Hereinafter, a preferred embodiment of the present invention will be explained in more detail with reference to the accompanying drawings.

Figure 1:
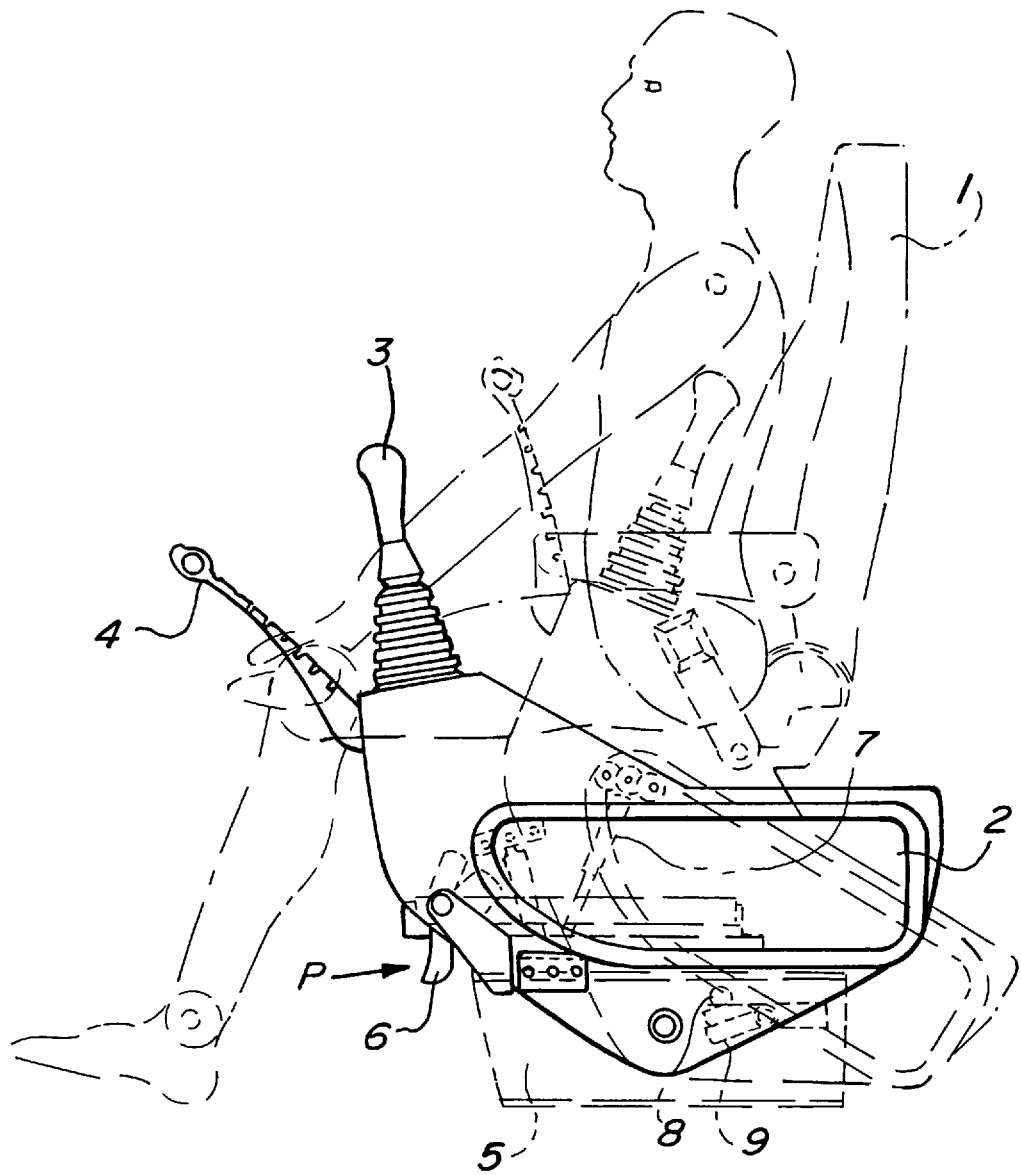
FIG. 1 illustrates a safety lever apparatus according to the prior art.
Figure 2:
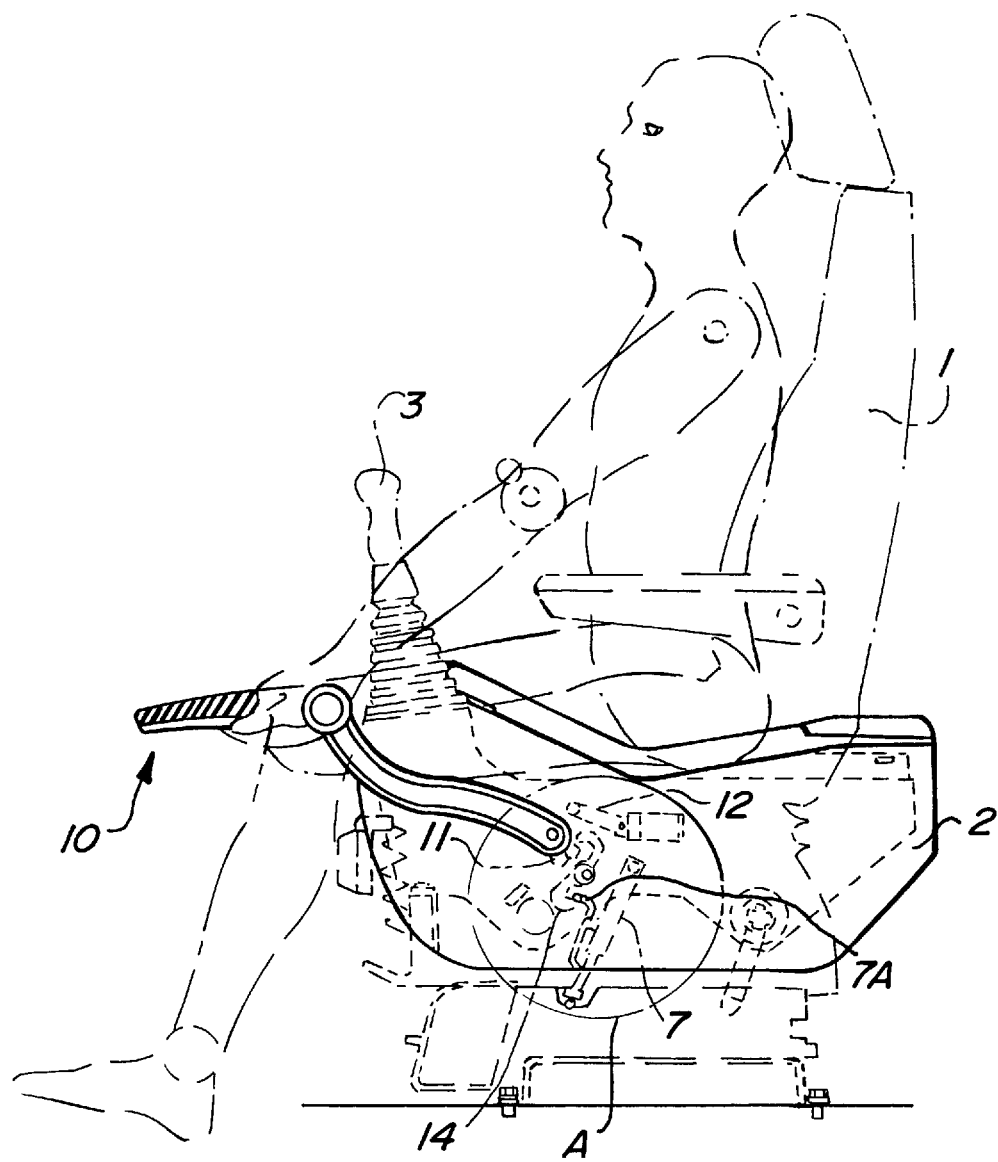
FIG. 2 illustrates a safety lever apparatus according to a preferred embodiment of the present invention.

FIG. 2 illustrates a safety lever apparatus according to the preferred embodiment of the present invention. Referring to FIG. 2, an operating box 2 is rotatably mounted to one side of an operating seat 1 of a heavy equipment. The operating box 2 is provided with a working lever 3 and can rotate by receiving an expansion force of a gas spring 7. A complex lever 10 is pivotally fixed to an outer side surface of the operating box 2 at its one end. The complex lever 10 is essentially operated by an operator of the heavy equipment at the time that the operator leaves an operating room of the heavy equipment.

A first cam member 11 having a predetermined shape is pivotally fixed to the operating box 2 along the same axial line as the complex lever 10. The first cam member 11 is provided with a limit switch bar 13 (referred to FIG. 3). The limit switch bar 13 supports a limit switch lever 12 which is pivotally fixed to the operating box 2 at a predetermined position, and blocks an operating force of the working lever 3 according to the rotation of the limit switch lever 12.

The complex lever 10 has a first groove (not shown) which is formed at one side of the complex lever 10. The first cam member 11 has a protrusion (not shown) protruding from one surface of the first cam member 11. The protrusion corresponds to the first groove. The complex lever 10 and the first cam member 11 rotate together by the engagement of the first groove and the protrusion.

Figure 3:
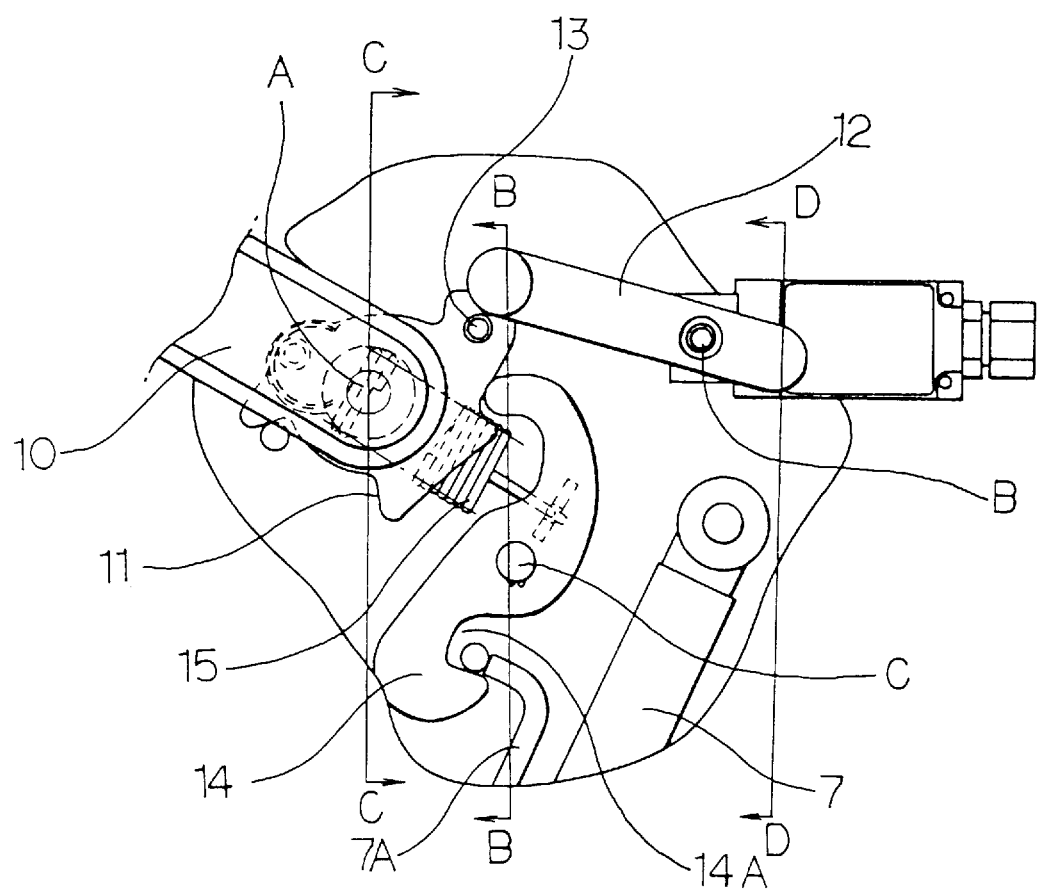
FIG. 3 is an enlarged view for detailedly showing the A portion shown in FIG. 2.

FIG. 3 is an enlarged view for detailedly showing the A portion shown in FIG. 2. Referring to FIG. 3, the first cam member 141 is connected with a second cam member 14 by a tension spring 15. The second cam member 14 is pivotally fixed to the operating box 2 at a predetermined position. Accordingly, if the operator rotates the complex lever 10 in the clockwise direction in order to restart a work, the operating box 2 rotates in the counterclockwise direction.

The second cam member 14 rotates together with the first cam member 11 at the time that the first cam member 11 rotates. The second cam member 14 is pivotally fixed to one side of the operating box 2. The second cam member 14 is always brought into contact with the first cam member 14 by the tension spring 15. One end of the tension spring 15 is fixed to the first cam member 11 and the other end of the tension spring 15 is fixed to the second cam member 14. Accordingly, the second cam member 14 can operate as a cam mechanism according to the movement of the first cam member 11.

Figure 4A:
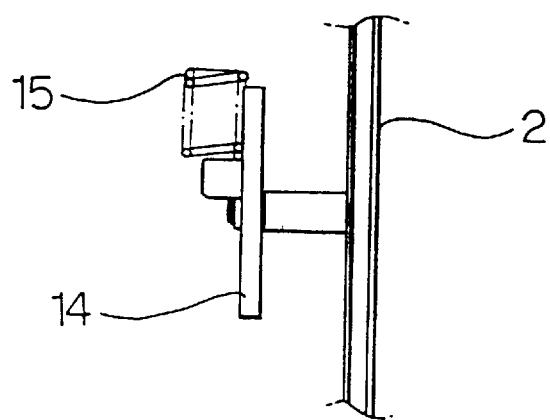
FIG. 4A is a schematic sectional view taken along line of B—B shown in FIG. 3.
Figure 4B:
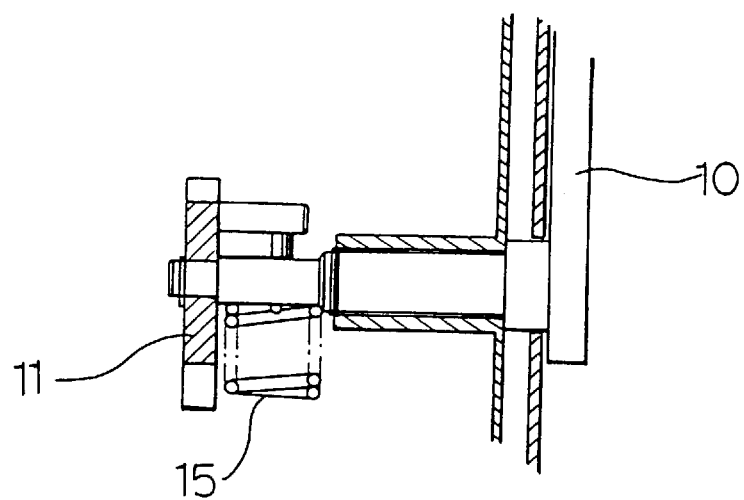
FIG. 4B is a schematic sectional view taken along line of C—C shown in FIG. 3.
Figure 4C:
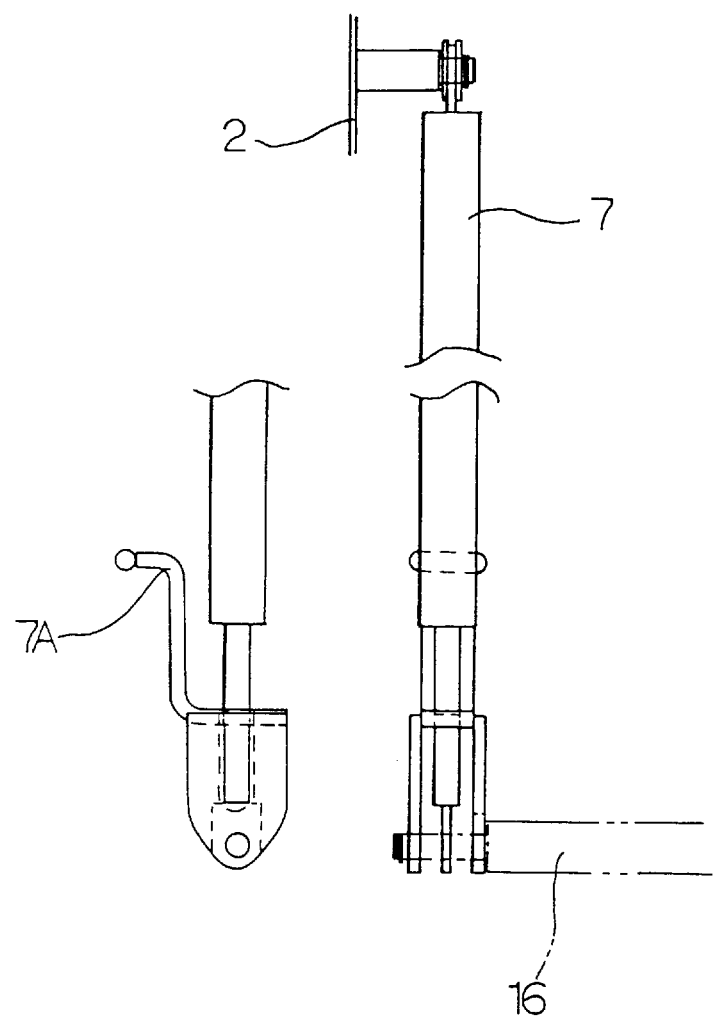
FIG. 4C is a schematic sectional view taken along line of D—D shown in FIG. 3.

One end of gas spring 7 is pivotally fixed to a seat bracket 16 and the other end of gas spring 7 is pivotally fixed to the operating box 2 (referred to FIG. 4C). The operating box 2 rotates according to the extension and the contraction of the gas spring 7. The gas spring 7 is provided with a stopper 7A which is installed to one side of the gas spring 7. The second cam member 14 is provided with a second groove 14A corresponding to the stopper 7A. Accordingly, if the stopper 7A is inserted into the second groove 14A, the gas spring 7 is maintained as a stable contraction state.

Figure 5:
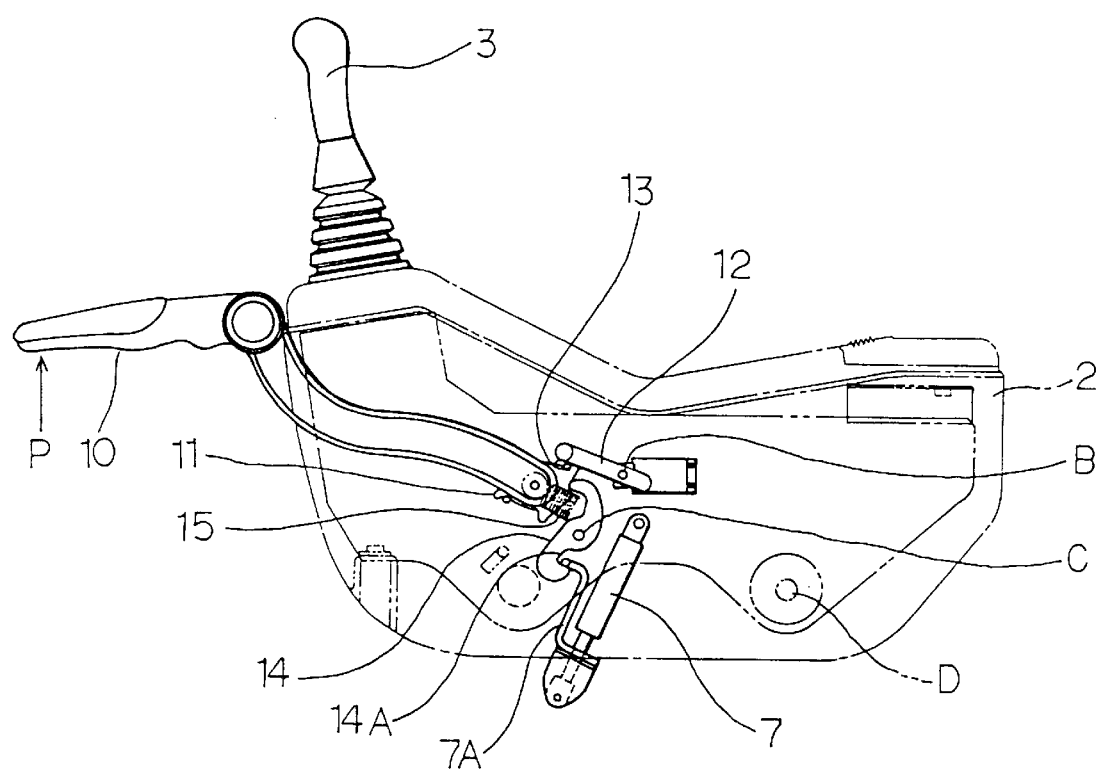
FIGS. 5 to 8 illustrate an operating process of the safety lever apparatus according to the preferred embodiment of the present invention.
Figure 6:
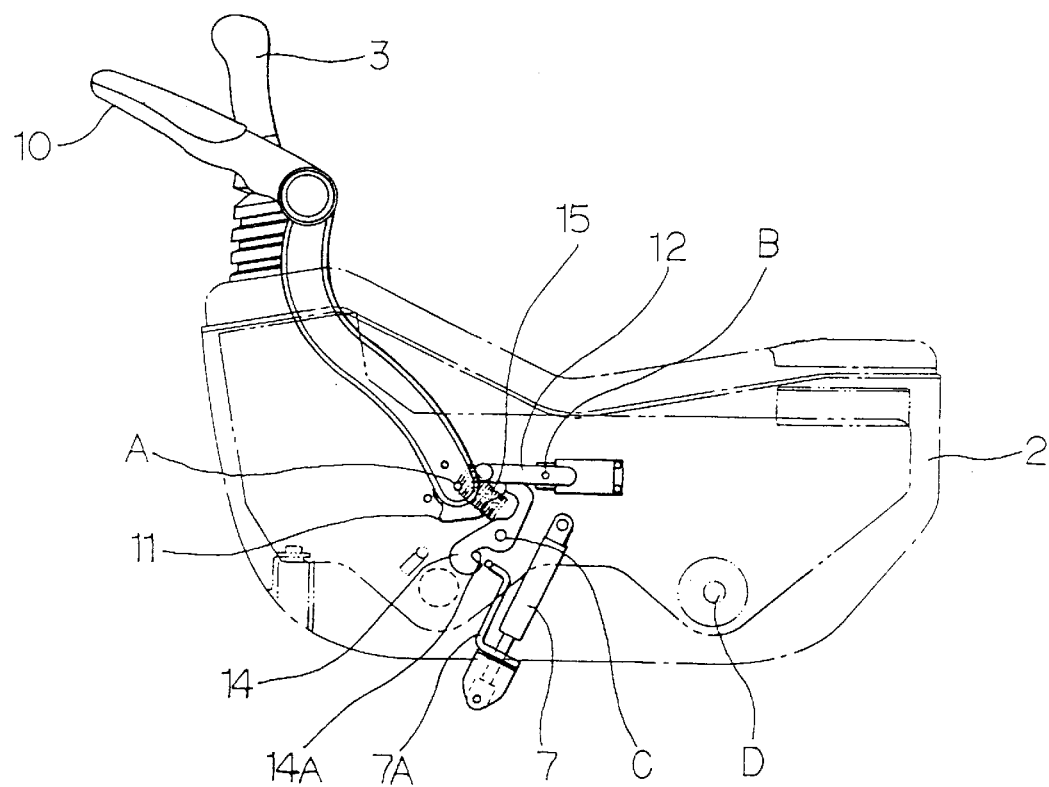
Figure 7:
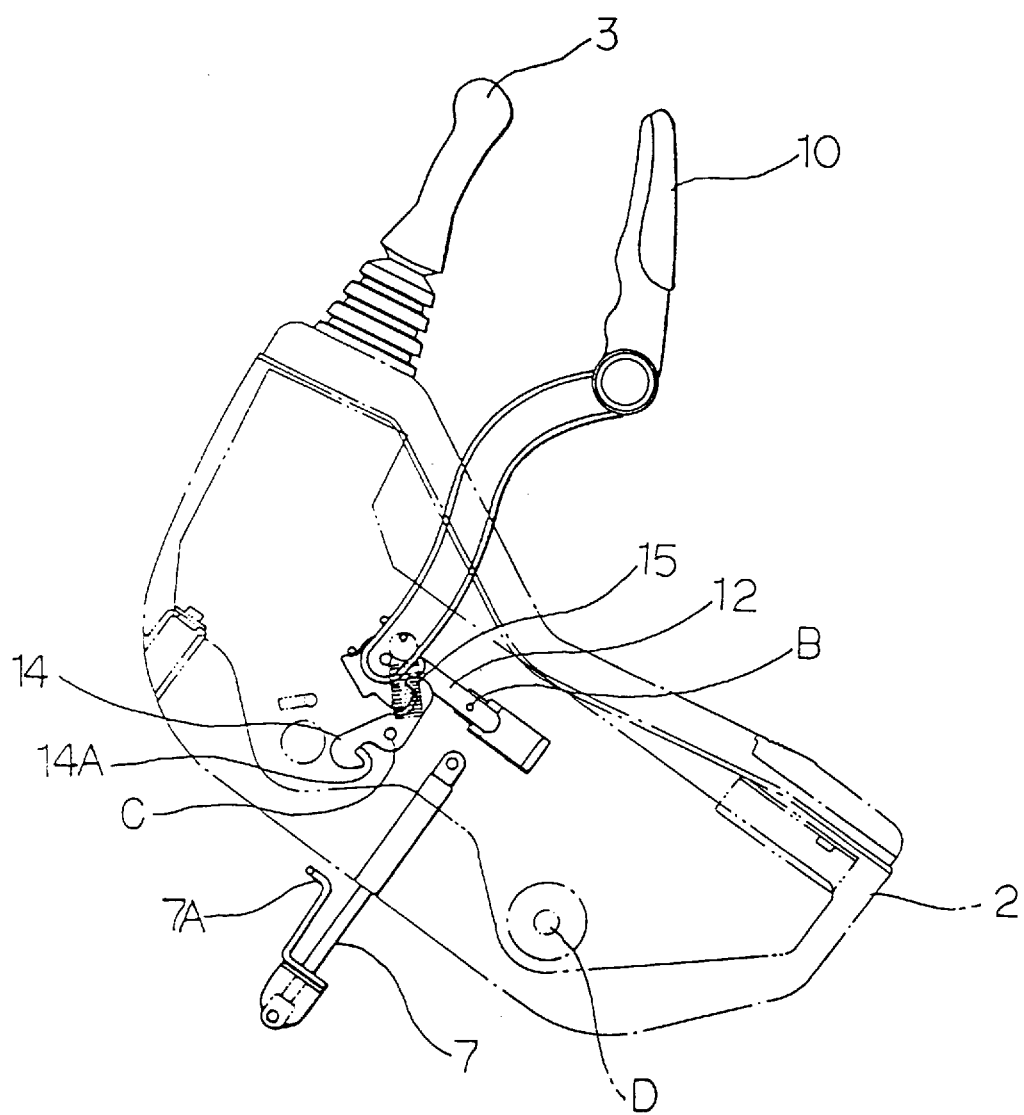

Hereinbelow, an operation of the safety lever apparatus according to the preferred embodiment of the present invention as described above will be explained with reference to FIGS. 5 to 7.

When an operator wants to leave from the operating seat 1 under the state that an engine of the equipment operates, the operator rotates the complex lever 10 in the clockwise direction with a hinge portion (A) as the central axis. Thereby, the first cam member 11 rotates in the clockwise direction with the hinge portion (A) as the central axis, and the limit switch lever 12 rotates in the counter-clockwise direction with a hinge portion (B) as the central axis. As a result, an electric source of the limit switch is converted to an off-state. Thereby, the operating force which is transferred from the working lever 3 to the equipment is blocked, and an incorrect operation of the heavy equipment due to a physical contact between the working lever 3 and the operator of the heavy equipment is prevented.

Meanwhile, the second cam member 14 rotates in the clockwise direction with a hinge portion (C) as the central axis due to the rotation of the first cam member 11, and thereby the stopper 7A of the gas spring 7 is released from the second groove 14A of the second cam member 14. If the stopper 7A is released from the second groove 14A, the gas spring 7 extends and the operating box 2 which is connected with the gas spring 7 rotates in the clockwise direction with a hinge portion D as the central axis (referred to FIG. 7). At this time, the complex lever 10 rotates in the counter-clockwise direction due to an elastic force of the tension spring 15. Accordingly, the operator easily leaves from the operating room under the state that the operating force of the working lever 3 is blocked.

When the operator wants to return the operating box 2 to the origin in order to perform the following works after returning to the operating seat 1, the operator pressurizes the complex lever 10 which is rotated from the operating seat 1 in a predetermined angle, whereby the complex lever 10 rotates in the counter-clockwise direction with the hinge portion A as the central axis. Then, the first cam member 11 rotates in the counter-clockwise direction with the hinge portion A of the complex lever 10 as the central axis. As a result, the limit switch bar 13 mounted to one side of the first cam member 11 and the limit switch bar 12 which is supported by the limit switch bar 13 rotate in the clockwise direction with the hinge portion (B) as the central axis (referred to FIGS. 7 and 8). Accordingly, the electric source of the limit switch is converted to an on-state.

Figure 8:
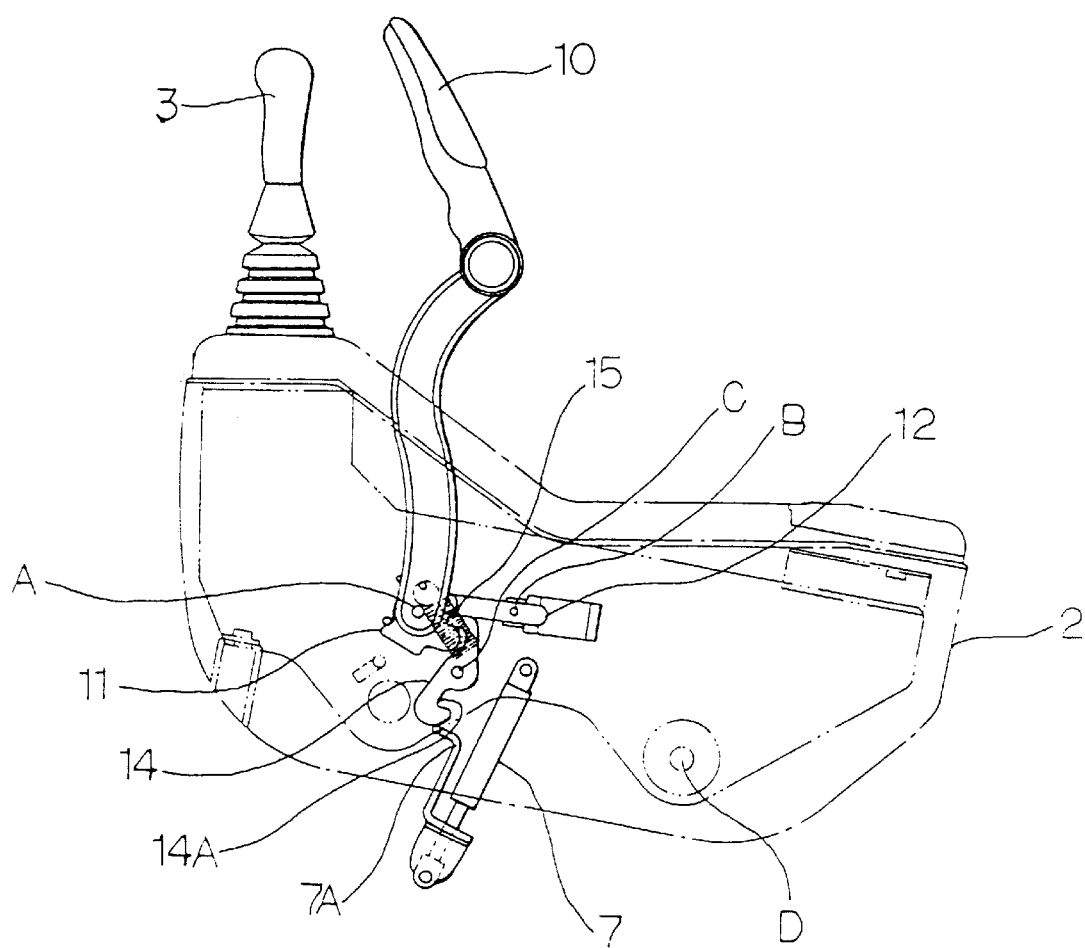

Further, if the operator rotates the second cam member 14 in the counter-clockwise direction with the hinge portion (C) as the central axis during the rotation of the first cam member 11, the state illustrated in FIG. 8 is accomplished.

Meanwhile, under the state illustrated in FIG. 8, when the operator pressurizes the complex lever 10, the complex lever 10 rotates in the counter-clockwise direction with the hinge portion (A) as the central axis. Then, the second cam member 12 which is supported by the first cam member 11 slides against the stopper 7A and rotates in the clockwise direction with the hinge portion (C) as the central axis. As a result, the second cam member 12 moves the position as shown in FIG. 2.

At this time, the stopper 7A is inserted into the second groove 14A of the second cam member 14 by the elastic force of the tension spring 15 which is fixed to the first cam member 11 at its one end and fixed to the second cam member 14 at its the other end. Accordingly, the complex lever 10 rotates in the counter-clockwise direction with the hinge portion (A) as the central axis. Further, the limit switch lever 12 rotates in the clockwise direction with the hinge portion (B) as the central axis by the limit switch bar 13 of the first cam member 11. Thereby, the electric source of the limit switch is converted to the on-state. As a result, the operator can operate the heavy equipment.

Therefore, the complex lever 10 provides a function of the safety lever at the time the operator leaves from the operating room under the state that the engine of the heavy equipment operates. In addition, the complex lever 10 provides a function of an operating lever for rotating the operating box.

As described above, in the safety lever apparatus according to the present invention, the operator of the heavy equipment can safely leave from the operating room by using the safety lever under the state that the engine of the heavy equipment operates. The safety lever provides the function of the operating lever for rotating the operating box. Accordingly, the number of assemble parts constructing the equipment decreases. Further, the incorrect operation of the heavy equipment due to a physical contact between the working lever and the operator of the heavy equipment at the time that the operator leaves from or returns to the operating room during the operation of the heavy equipment can be prevented. As a result, an accident due to the careless operator can be prevented.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. A safety lever apparatus comprising:

an operating box being rotatably mounted to an operating seat, said operating box including an operating means for directing a predetermined work to an equipment;

a complex lever being pivotally fixed to said operating box, said complex lever being operated by an operator of the equipment in order to allow the operator for going out of an operating room;

a first cam member for blocking or for allowing transmission of an operating force which is transmitted from said operating means to a working device, said first cam member rotating together with said complex lever;

a means for rotating said operating box due to an expansion and a contraction of a spring; and a second cam member for controlling the expansion and the contraction of said rotating means, said second cam member operating as a cam mechanism in relation to the movement of said first cam member, and said second cam member being pivotally fixed to said operating box.

2. A safety lever apparatus as claimed in claim 1, wherein said second cam member is provided with a second groove which is formed at one side of said second cam member, said rotating means is provided with a stopper which is installed to one side of said rotating means, said rotating means being contracted at the time that said stopper is inserted into said second groove, and said rotating means expands at the time that said stopper leaves from said second groove.

3. A safety lever apparatus as claimed in claim 1 or 2, wherein said operating box is provided with a limit switch lever which is pivotally fixed to said operating box, said first cam member includes a limit switch bar for rotating said limit switch lever at the time that said complex lever rotates and for blocking an operation force which is transmitted from said operating means to said working device.

4. A safety lever apparatus as claimed in claim 1 or 2, wherein said complex lever is provided with a first groove which is formed at one side of said complex lever, said first cam member is provided with a protrusion corresponding to said first groove, said complex lever and said first cam member rotate together by the engagement of said first groove and said protrusion.

5. A safety lever apparatus as claimed in claim 3, wherein said complex lever is provided with a first groove which is formed at one side of said complex lever, said first cam member is provided with a protrusion corresponding to said first groove, said complex lever and said first cam member rotate together by the engagement of said first groove and said protrusion.

6. A safety lever apparatus as claimed in claim 5, wherein said rotating means comprises a gas spring.

7. A using method of a safety lever apparatus, comprising the steps of: rotating a complex lever which is pivotally fixed to an operating box;

blocking an operating force for directing a predetermined work to an equipment by the rotation of a first cam member related to said complex lever according to the rotation of said complex lever, said operating force being transmitted from an operating means to the equipment; and releasing a fixing means for fixing a first spring at a contraction state due to the movement of a second cam member operating as a cam mechanism in relation to the movement of said first cam member, and rotating said operating box which is connected with a second spring by an expansion of the first spring.

8. A using method of a safety lever as claimed in claim 7, wherein said second cam member is provided with a second groove which is formed at one side of said second cam member, said second spring is provided with a stopper which is installed to one side of said second spring, said second spring expands at the time that said stopper leaves from said second groove.

* * * * *